Nov. 15, 1955 A. HALLUM 2,723,496
SEED STARTING GROUND WARMING FURNACE
Filed Aug. 13, 1952
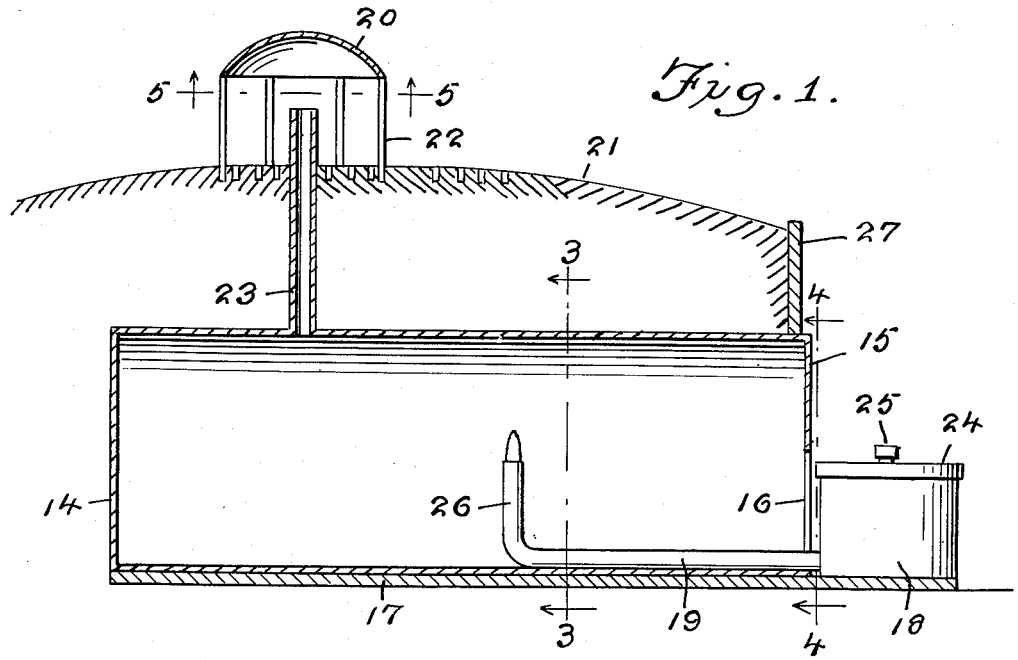
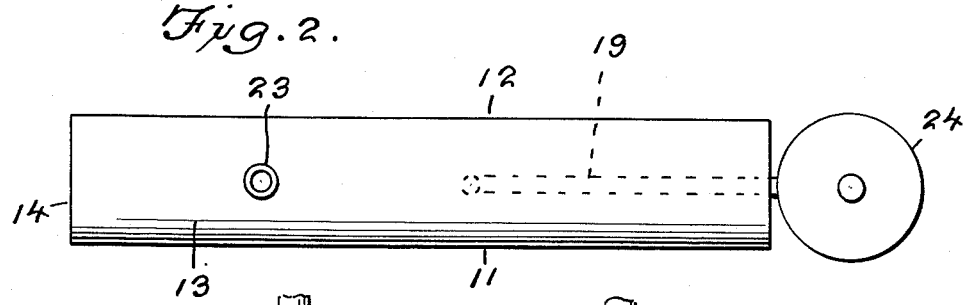
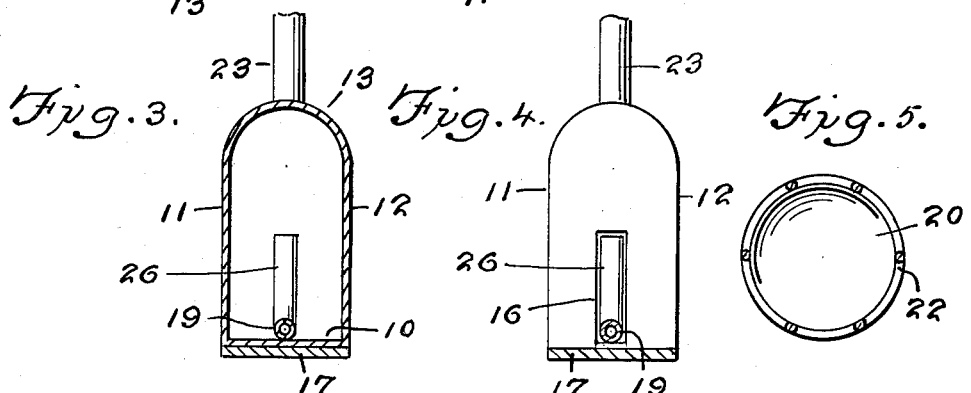
INVENTOR.
Andrew Hallum
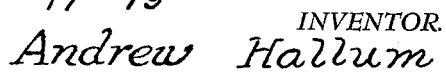
ATTORNEYS

United States Patent Office 2,723,496
Patented Nov. 15, 1955

2,723,496

SEED STARTING GROUND WARMING FURNACE

Andrew Hallum, Waterloo, Iowa

Application August 13, 1952, Serial No. 304,197

2 Claims. (Cl. 47—19)

This invention relates to devices for starting seeds, such as watermelon seeds, in the spring before the ground is sufficiently warm to start the seeds, and in particular a small furnace or heater embedded in the ground and having a burner at the end of a tube extended from a tank with an outlet extended upwardly through the ground and with a hood positioned above the ground and carried by legs the lower ends of which extend into the ground.

The purpose of this invention is to provide an improved ground warming device adapted to be placed below a hill having seeds therein and that is adapted to operate continuously until the ground is warmed by atmospheric conditions.

This ground warming device is an improvement over the device illustrated in my co-pending application filed December 5, 1951, with the Serial No. 260,022 in that the heating chamber is comparatively small so that it may readily be permanently positioned below a hill of watermelons or the like.

It has been found that for universal use devices of this type must be comparatively inexpensive to install and operate as it is necessary to use a complete device in each watermelon hill. With this thought in mind this invention contemplates a ground warming device which consists only of a casing with a burner tube extended from a tank at one end of the casing and with a hood carried by legs and that is adapted to be positioned over an outlet connection from the casing.

The object of this invention is, therefore, to provide means for forming a ground warming device whereby a complete device may be used under each hill of watermelons.

Another object of the invention is to provide a ground warming device for use in seed hills in which heat from the device is evenly distributed throughout the hill.

A further object of the invention is to provide a ground warming device for use in starting seeds before the ground is warmed by the atmosphere in which the device is of a simple and economical construction.

With these and other objects and advantages in view the invention embodies an elongated casing, substantially rectangular shaped in cross section and having an arcuate upper end, an outlet connection extended from the upper end of the casing, a fuel supply tank with a burner tube extended therefrom positioned at one end of the casing and with the burner tube extended into the casing, and a hood having spaced legs supported by the legs above the ground over the outlet connection of the casing.

Other features and advantages of the invention will appear from the following description taken in connection with the drawing, wherein:

Figure 1 is a longitudinal section through the ground warming device of this invention showing the device installed in a hill such as a hill in which watermelon seeds are positioned.

Figure 2 is a plan view of the ground warming device.

Figure 3 is a cross section through the casing of the ground warming device taken on line 3—3 of Fig. 1.

Figure 4 is an end elevational view of the casing of the device taken on line 4—4 of Fig. 1.

Figure 5 is a detail taken on line 5—5 of Fig. 1 showing the under surface of the hood positioned above the outlet connection of the casing.

Referring now to the drawing wherein like reference characters denote corresponding parts the improved ground warming device of this invention includes a casing having a base 10 with side walls 11 and 12, an arcuate upper end 13, an enclosed end 14 and a front 15 having an opening 16 therein, a plate 17 providing a continuous base, a fuel supply tank 18 having a burner tube 19 extended therefrom and a hood 20 supported in spaced relation above the ground, which is indicated by the numeral 21, with legs 22.

The top or arcuate upper end of the casing is provided with a tube 23 that is spaced from the end 14 and that extends upwardly through the upper surface of the ground. The upper end of the tube 23 is positioned below the hood 20 whereby heated gases passing upwardly from the burner chamber are deflected downwardly and spread over the surface of the ground.

The fuel supply tank 18 is provided with a cover 24 having a knob 25 thereon to facilitate refilling with fuel and the burner tube 19 which extends from the lower part of the tank 18 is provided with an upwardly extended end 26 which forms a burner.

The casing may also be provided with a facing plate 27 which holds the soil in the hill preventing the soil dropping downwardly over the fuel tank and also preventing the soil closing the opening 16 through which air is supplied to the burner.

As illustrated in Fig. 1 the burner tip or upwardly extended end 26 of the tube 19 is positioned substantially midway of the length of the casing and it will be noted that the burner is offset in relation to the outlet tube 23 whereby the heated gases circulate throughout the interior of the casing.

With the parts formed in this manner the fuel tank 18 may be refilled as desired and the burner with the tank may be withdrawn for cleaning without removing the casing from the ground.

After the season has progressed until the ground is warmed by the atmosphere the entire casing may be removed if desired, and to facilitate removing the casing the tube 23 may be provided as a separate element, a wire screen may be used over the casing and the casing freely positioned on the base.

It will be understood that modifications, within the scope of the appended claims, may be made in the design and arrangement of the parts without departing from the spirit of the invention.

What is claimed is:

1. In a ground warmer, an elongated hollow casing including a horizontally disposed base, a pair of spaced parallel side walls extending upwardly from the longitudinal side edges of said base, a curved top interconnecting the top of said side walls together, a first and second spaced parallel vertically disposed end wall extending upwardly from the ends of said base, said casing projecting into a hill having growing seeds therein, said second wall being positioned in the ground comprising the hill, and said first wall being arranged exteriorly of said hill, there being a rectangular slot in said first wall, said slot extending upwardly from said base and having its upper end terminating below the top of said end wall, a vertically disposed tube extending through said hill and having its upper end extending above said hill and its lower end secured to the top of said casing, a curved hood spaced above the top of said tube, a plurality of spaced parallel vertically disposed legs depending from said hood and engaging said hill, a facing plate arranged exteriorly of said hill and positioned above said casing, a horizontally disposed plate abutting the lower surface of said base, the inner end of said plate being flush with the inner end of said base, the outer end of said plate projecting beyond the outer end of said casing, a fuel supply tank mounted on the projecting end of said plate, a burner tube extending from said tank through said slot, the inner end of said burner tube extending upwardly at right angles to the major portion of said burner tube, a cover mounted on said tank, and a knob connected to said cover.

2. In a ground warmer, an elongated hollow casing including a base, a pair of side walls extending upwardly from said base, a curved top interconnecting the top of said side walls together, a first and second end wall extending upwardly from the ends of said base, said casing projecting into a hill having growing seeds therein, said second wall being positioned in the ground comprising the hill, and said first wall being arranged exteriorly of said hill, there being a slot in said first wall, said slot extending upwardly from said base and having its upper end terminating below the top of said end wall, a tube extending through said hill and having its upper end extending above said hill and its lower end secured to the top of said casing, a curved hood spaced above the top of said tube, a plurality of legs depending from said hood and engaging said hill, a facing plate arranged exteriorly of said hill and positioned above said casing, a plate abutting the lower surface of said base, the inner end of said plate being flush with the inner end of said base, the outer end of said plate projecting beyond the outer end of said casing, a fuel supply tank mounted on the projecting end of said plate, a burner tube extending from said tank through said slot, the inner end of said burner tube extending upwardly at right angles to the major portion of said burner tube, a cover mounted on said tank, and a knob connected to said cover.

References Cited in the file of this patent

UNITED STATES PATENTS

| Number | Name | Date |
|---|---|---|
| 323,151 | Horner | July 28, 1885 |
| 490,531 | Alger | Jan. 24, 1893 |
| 810,835 | Austin | Jan. 23, 1906 |
| 931,712 | Adair | Aug. 24, 1909 |
| 988,309 | Campbell | Apr. 4, 1911 |
| 1,077,324 | Williams | Nov. 4, 1913 |
| 1,090,251 | Van Schoiack | Mar. 17, 1914 |
| 2,006,562 | Schen | July 2, 1935 |
| 2,051,348 | Smith | Aug. 18, 1936 |
| 2,609,641 | Hallum | Sept. 9, 1952 |